INVENTOR
WILLIAM H. PETTIT
BY *John Gibson Semmes*
ATTORNEY

Dec. 28, 1965 W. H. PETITT 3,225,839
MECHANISM FOR ADJUSTING TOOL AND GROUND SUPPORT
RELATIVE TO SUPPORTING FRAME
Filed Nov. 2, 1964 4 Sheets-Sheet 2

INVENTOR
WILLIAM H. PETTIT
BY John Gibson Semmes
ATTORNEY

Dec. 28, 1965 W. H. PETITT 3,225,839
MECHANISM FOR ADJUSTING TOOL AND GROUND SUPPORT
RELATIVE TO SUPPORTING FRAME
Filed Nov. 2, 1964 4 Sheets-Sheet 3

INVENTOR
WILLIAM H. PETTIT

BY *John Gibson Semmes*

ATTORNEY

Dec. 28, 1965         W. H. PETITT        3,225,839
MECHANISM FOR ADJUSTING TOOL AND GROUND SUPPORT
RELATIVE TO SUPPORTING FRAME
Filed Nov. 2, 1964                                            4 Sheets-Sheet 4
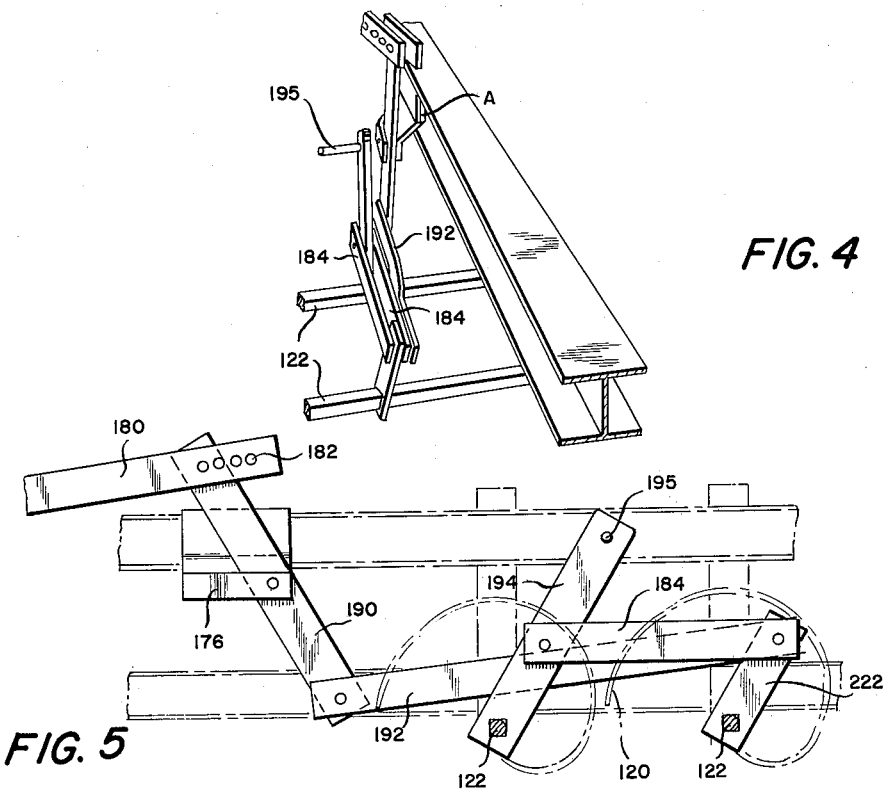
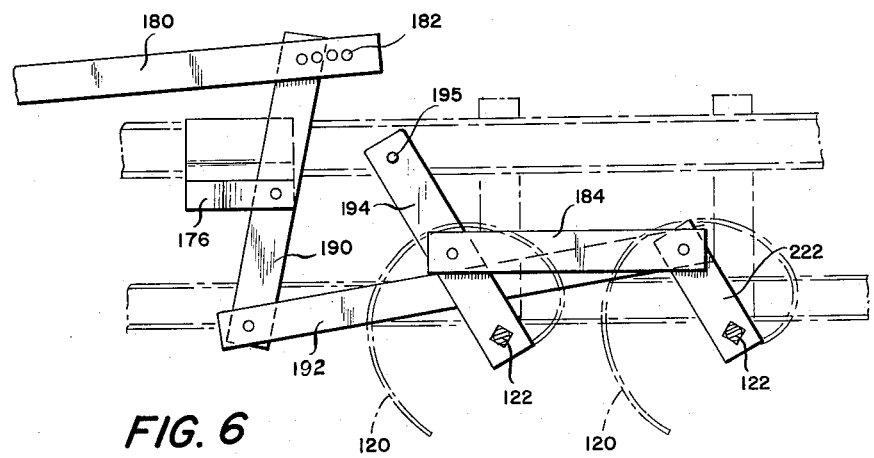
INVENTOR
WILLIAM H. PETITT
BY Semmes & Semmes
ATTORNEYS

United States Patent Office 3,225,839
Patented Dec. 28, 1965

3,225,839
MECHANISM FOR ADJUSTING TOOL AND GROUND SUPPORT RELATIVE TO SUPPORTING FRAME
William H. Petitt, 5310 Connell St., Chattanooga, Tenn.
Filed Nov. 2, 1964, Ser. No. 409,351
1 Claim. (Cl. 172—398)

This application is a continuation-in-part of application Serial No. 185,596, filed April 6, 1962 and entitled Seed Bed Preparation Device, now abandoned.

The present invention relates to agricultural cultivators, particularly to a seed bed preparation device wherein a plurality of ground engaging components are pivotably supported upon a wheel-transported frame.

Numerous previous inventors have devised cultivator frames which aggregatively support a plurality of ground engaging elements. Sometimes, these frames have had pivotably supported therein a pair of transport wheels so that the frame might be transported from place to place without the implements engaging the ground. However, these devices have not provided means for cooperatively and simultaneously disengaging the implements from the ground, according as the transport wheels are pivoted towards the ground. More specifically, these devices have not provided means for varying the degree of pivotability of both the transport wheels and the implements so that the transport wheels might be utilized to support the frame while the implements are also engaging the ground at a pre-determined degree of cut. Note Mighell (U.S. Patent 3,006,422) who discloses means for automatically engaging and disengaging respective transport and tilling components. However, Mighell fails to teach the use of a simple, structurally uncomplicated, manual actuating means corresponding to the present invention, as disclosed hereinafter. Not only is Mighell's manual adjusting means more complicated than that of the present invention, but necessitates the use of an independent rock shaft as illustrated in FIG. 12.

According to the present invention, a plurality of ground engaging elements, such as spring tooth harrow, pulverizer wheels, peg-tooth harrow and drag board may be pivoted in an agricultural frame. A rock shaft may be pivoted in the frame and a pair of transport wheels may depend from the rock shaft. Link means are provided for interconnecting the rock shaft and one or more of the ground-engaging implements. A hydraulic cylinder is employed to pivot the rock shaft, thus resulting in longitudinal movement of the link means and simultaneous pivoting of ground-engaging implements so that as the transport wheels engage the ground, the ground engaging elements are withdrawn from the ground and vice-versa.

Accordingly, it is an object of invention to provide an agricultural cultivator wherein the ground engaging implements are pivotably linked to a pair of pivotable transport wheels.

Another object of invention is to provide in a seed bed preparation device transport wheel means for selectively varying the degree of cut of the ground engaging implements.

Yet additional objects of invention will become apparent from the ensuing specification and attached drawings wherein:

FIG. 1 is a perspective view of the device showing an agricultural frame supporting spring tooth harrow 120, pulverizer wheels 130, transport wheel 160, peg-tooth harrow 140 and drag board 150 components;

FIG. 4 is a perspective view showing a manual lever and associated linkage permitting pivoting of tooth bars 122;

FIG. 5 is an enlarged vertical section, showing the tooth bars 122 in "raised" position; and FIG. 6 is an enlarged vertical section, showing the tooth bars 122 in "lowered" position.

Figure 1:
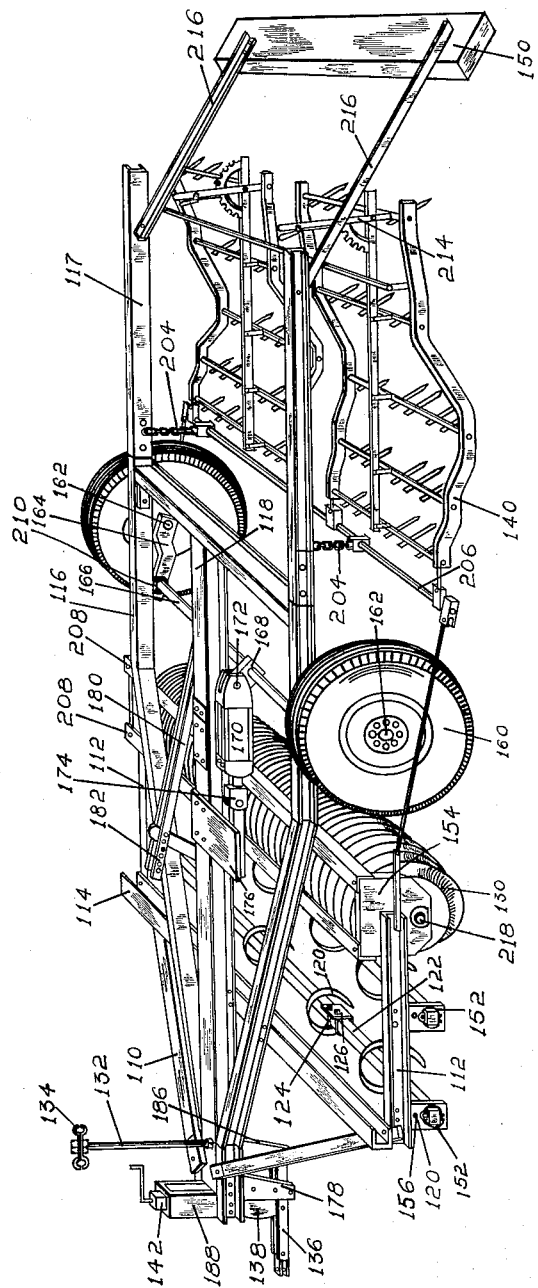

In FIG. 1 main frame 116 is shown as including converging front portions 110 medially of which is attached longitudinally hitch beam 118. Extension channel members 117 may be bolted rearwardly of frame 116 to support peg-tooth harrow 140 components. Spring tooth harrow implement 120 are shown as supported upon tooth bars 122 by means of U-bolts 124 and tooth bar clamp clips 126. Tooth bars 122 in turn are supported in tooth bar bearings 128 mounted in the tooth bar arm 152. Tooth bar arms 152 depend from end cross racks 112 which are secured to braces 110 and spring tooth front frame channel iron 114. Also supported in cross racks 112 are pulverizer wheels 130 mounted upon axle 218 supported in pulverizer end plates 154. Pulverizer end plates 154 are laterally secured by front and rear angle irons 208. A pulverizer wheel scraper (not illustrated) may be attached to the rear angle iron 208 in order to remove impacted earth from between the pulverizer wheels.

Rock shaft 166 is supported rearwardly of pulverizer wheels 130 in brackets 210, attached to the frame 116. Rock shaft wheel arms 164 depend on either side from rock shaft 166 and contain at their lower extremity individual wheel axle 162 to which the transport wheels 160 are attached. Rock shaft 166 has both a cylinder arm 168 and an adjusting arm 148. Hydraulic cylinder 170 is pivoted by pin 172 to attaching arm 168 and at its other end is attached to cylinder bracket arm 174 which is supported by cylinder bracket 176 welded or bolted to the beam 118. Hydraulic cylinder hoses (not illustrated) leading from the tractor may be supported in clamps 134 of hose support arm 132 en route to cylinder 170. As will be apparent, as the cylinder is actuated so that the cylinder piston is longitudinally extended, rock shaft 166 pivots so as to cause wheels 160 to engage the ground and lift the ground-engaging implements from their contact with the ground.

Figure 2:
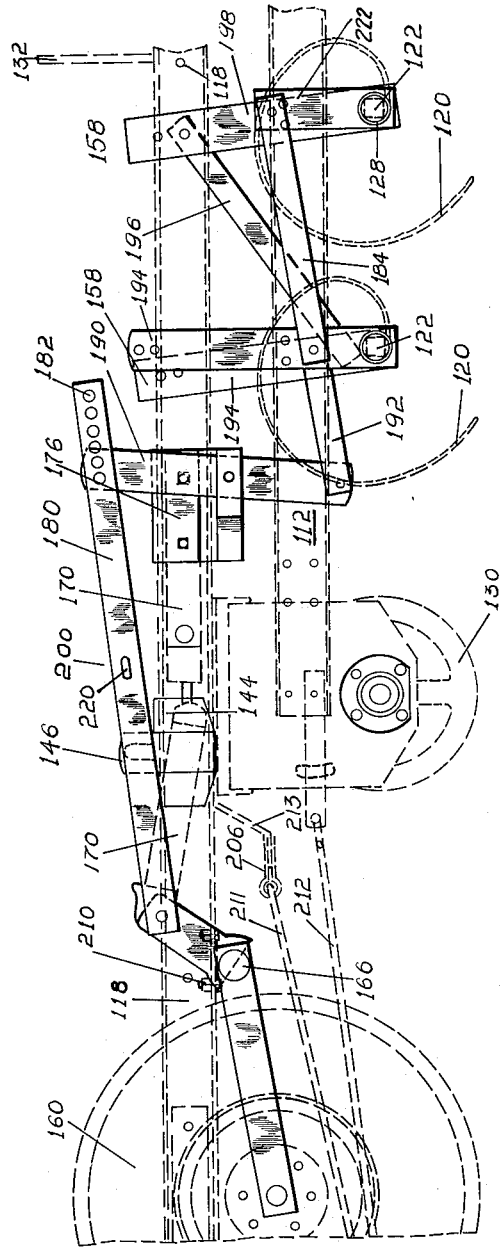
FIG. 2 is an enlarged vertical section, showing the link means interconnecting the rock shaft 166 and the spring tooth harrow tooth bars 122.
Figure 3:
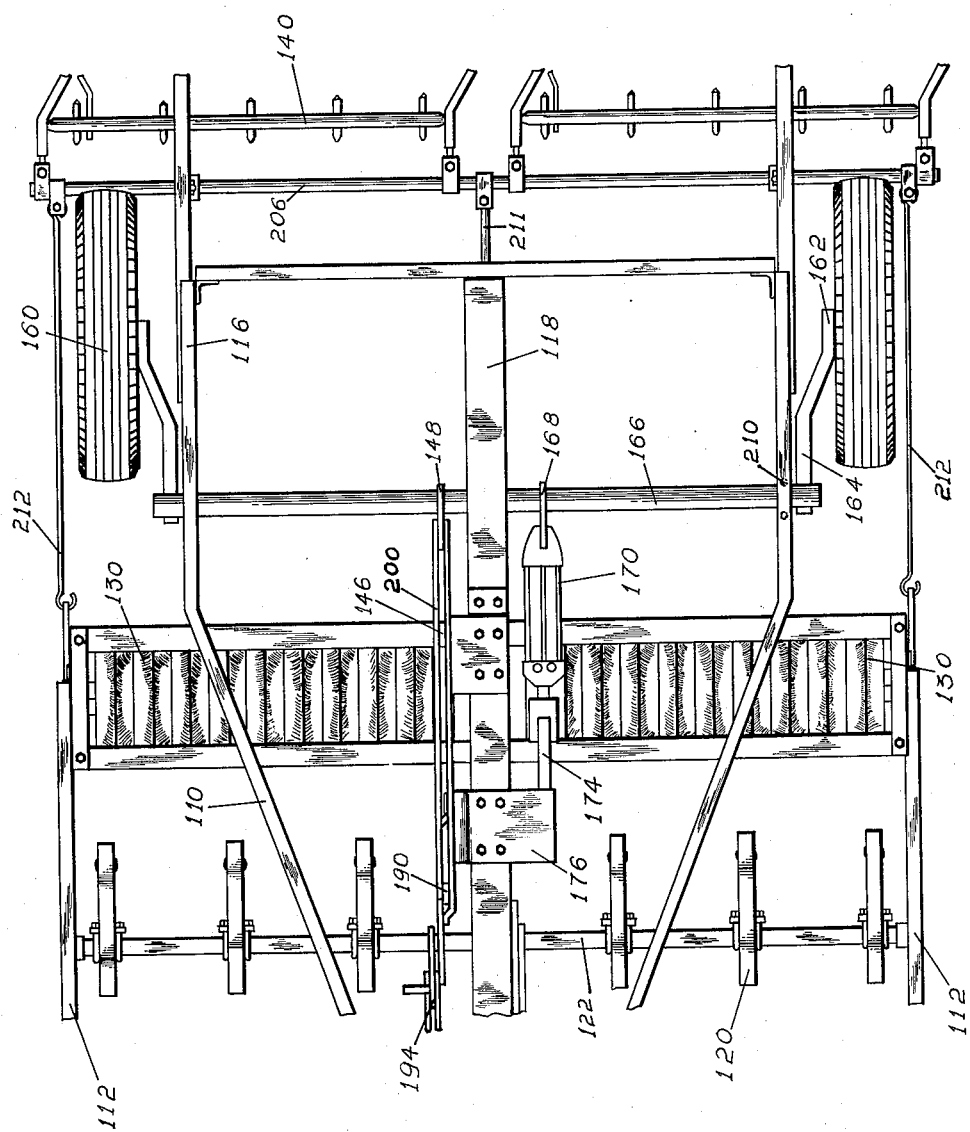
FIG. 3 is a fragmentary top plan showing the link means supported on the frame intermediate the harrow and transport wheels.

As particularly illustrated in FIGS. 2 and 3, dual tooth bar adjusting arms 180 are pivoted at their one ends to control arm 148 and at their other ends to bell crank 190 which is pivoted to cylinder bracket 176 adjacent hitch beam 118 by means of saddle bracket 202. Tooth bar adjusting arms 180 employ a plurality of longitudinal adjusting apertures 182 in order that the degree of pivotability of tooth bars 122 may be varied. The foremost hole provides the deepest degree of pivotability and thus the deepest cut into the earth and the rear hole provides a shallow cut. Also, two longitudinally disposed holes (not illustrated) may be employed at the top of bell crank 190 to provide an additional pivotability adjusting feature. Also, similar longitudinally disposed holes (not illustrated) might be provided in the forward end of tooth bar control link 192. Tooth bar adjusting arms 180 employ a medial aperture 200 which is registrable with an aperture 220 in transport bracket extension 146 supported in transport bracket 144. By inserting a pin through transport bracket extension aperture 220 and tooth bar adjusting arm aperture 200, the spring tooth harrow implements may be locked away from the ground in transport position when it is desired to move the device from one area to another.

Pivoted at the base of bell crank 190 is tooth bar control link 192 which in turn is pivoted to forward response lever 222. Set lever 194 is located intermediate bell crank 190 and forward response lever 222 and terminates in openings for enclosing tooth bar 122. Also, set lever 194 and response lever 222 are connected in pivoting relationship by bars 184 and 184'. Tooth bar center bearing standards 158 may be secured to hitch beam 118 in order to provide rigidity for the tooth bars pivoted therein. As illustrated in FIG. 2, upon pivoting of the rock shaft in one direction or the other by means of cylinder 170, the transport wheel arms and thus wheels 160 are pivoted in one direction while the spring teeth tooth bars 122 are pivoted in another direction. Also, the tooth bars 122 may be manually actuated by means of moving handle 195 of tooth bar set lever 194 to cause the teeth to engage the ground even though the wheels may be simultaneously engaging the ground. Whereas FIG. 5 shows the tooth bars 122 in "raised" position, FIG. 6 illustrates tooth bars 122 in "lowered" position. This adjustability provides for manually varying the degree of cut of teeth into the ground.

Peg-tooth harrow 140 may be supported upon extension channel members 117 rearwardly of transport wheels 160 by lift chains 204 which engage draw bar 206. Draw bar 206 in turn may be pulled by outer draw rods 212 which attach at one end to cross racks 112 and end plates 154 and at their other end attach to draw bar 206. Center draw rods 211 also attach at one end to draw bar 206, but at their other end converge and are attached by clevis or like means to a bracket secured to hitch beam 118. The degree of cut of the peg teeth in the ground may be adjusted by rear lever and ratchet 214. Also, drag board 150 may be attached to drag board arms 216 which are pivoted upon extension channel members 117.

In conventional devices when the ground engaging implements are raised to transport position, the forwardly positioned ground engaging implements do not rise as high as the rearwardly positioned implements. This action is referred to by farmers as "getting up like a cow" and results in unwanted cutting of the ground as well as damage to the implements. However, in the present device, once the transport wheels 160 are pivoted fully to the ground, spring teeth 120 are raised clear of the earth. As will be apparent, various other implements instead of the spring tooth harrow and those other implements shown may be linked to the rock shaft in order to provide cooperable pivotability with the transport wheels. Disk gangs, for example, may be substituted for the spring tooth harrow and seeder hoppers, fertilizer or insecticide and herbicide apparatus, planters and grain drills may be attached. The present device may be used as a cultivator or a once-over seed bed preparing device eliminating the necessity for the farmer's passing over the field several times with an individaul implement in order to obtain identical results at greater cost.

Manifestly, numerous changes in linkage, and substitution of elements may be resorted to without departing from the spirit and scope of invention, as defined in the sub-joined claim.

What is claimed is:

A seed bed preparation device, comprising:

(A) a frame;
(B) a plurality of ground engaging implements supported upon first and second tooth bars and pivoted on said frame;
(C) a rock shaft pivotably supported in said frame apart from said tooth bars and said ground engaging implements;
(D) a pair of transport wheels depending from said rock shaft;
(E) link means pivoted upon said frame and interconnecting said rock shaft and said tooth bars, said link means being longitudinally adjustable with respect to said tooth bars so as to vary the degree of pivotability of said tooth bars and the degree of cut of said ground engaging implements in the ground, said link means including
  (I) dual adjusting arms having first and second ends, said first ends secured to said rock shaft,
  (II) a bell crank located intermediate said second ends of said adjusting arms,
  (III) means for securing the top of said bell crank to said second ends of said arms in adjustable relationship along said arms,
  (IV) a control link pivotally attached at one end thereof to the bottom of said bell crank and at the other end thereof to said first tooth bar, and
  (V) dual bars having first and second ends, said first ends being pivotably attached to said first tooth bar; and
(G) manual control lever means for varying the degree of pivotability of said tooth bars and said implements independently of said rock shaft and the longitudinal position of said dual adjusting arms, said lever means including a set lever being fixedly secured at one end thereof to said second tooth bar and pivotably secured near its mid-portion to said second ends of said dual bars, said set lever terminating at the other end thereof in a handle.

References Cited by the Examiner

UNITED STATES PATENTS

| 600,663 | 3/1898 | Whipple | 172—398 X |
| 1,563,291 | 11/1925 | Rasmussen | 172—398 X |
| 2,153,038 | 4/1939 | Corbett | 172—398 |
| 2,691,930 | 10/1954 | Forgy | 172—398 X |
| 3,006,422 | 10/1961 | Mighell | 172—398 X |

FOREIGN PATENTS 1,072,788  9/1954  France.

References Cited by the Applicant

UNITED STATES PATENTS 3,006,422  10/1961  Mighell.
3,050,882  8/1962  Chattin.

ABRAHAM G. STONE, *Primary Examiner.*

ANTONIO F. GUIDA, *Examiner.*

J. O. BOLT, *Assistant Examiner.*